(12) United States Patent
Baba

(10) Patent No.: US 8,437,092 B2
(45) Date of Patent: May 7, 2013

(54) OPTICAL UNIT AND IMAGE PICKUP APPARATUS

(75) Inventor: Tomohiko Baba, Kanagawa (JP)

(73) Assignee: Sony Corporation, Tokyo (JP)

( * ) Notice: Subject to any disclaimer, the term of this patent is extended or adjusted under 35 U.S.C. 154(b) by 94 days.

(21) Appl. No.: 12/959,654

(22) Filed: Dec. 3, 2010

(65) Prior Publication Data
US 2011/0157725 A1    Jun. 30, 2011

(30) Foreign Application Priority Data

Dec. 24, 2009   (JP) ................................. 2009-291917

(51) Int. Cl.
*G02B 9/60*    (2006.01)
(52) U.S. Cl.
USPC .......................................... 359/767; 359/763

(58) Field of Classification Search .......... 359/754–757, 359/759, 763, 764, 767
See application file for complete search history.

(56) References Cited

U.S. PATENT DOCUMENTS 4,076,390 A * 2/1978 Fleischman ................... 359/767
7,443,610 B1 * 10/2008 Lin et al. ...................... 359/714
2003/0218808 A1   11/2003 Sekita

FOREIGN PATENT DOCUMENTS

JP           2003-329925       11/2003

* cited by examiner

*Primary Examiner* — Darryl J Collins
(74) *Attorney, Agent, or Firm* — Dentons US LLP

(57) ABSTRACT

An optical unit includes a first lens, a diaphragm, a second lens, a third lens, a fourth lens, and a fifth lens. The first lens is a positive meniscus lens which is convex toward an object side. The second lens has a positive power. The third lens has a negative power. The fourth lens has a positive power. The fifth lens has a negative power. Those are arranged in the stated order from the object side to an image plane side.

21 Claims, 6 Drawing Sheets

OPTICAL UNIT AND IMAGE PICKUP APPARATUS

BACKGROUND OF THE INVENTION

1. Field of the Invention

The present invention relates to an optical unit applied to image pickup equipment and an image pickup apparatus.

2. Description of the Related Art

In recent years, image pickup equipment mounted on a mobile phone, a personal computer (PC), or the like has been asked to realize a high resolution, a low cost, and miniaturization.

An image sensor, such as a CCD (charge coupled device) and a CMOS (complementary metal oxide semiconductor) image sensor, has a remarkably reduced cell pitch. Thus, an optical system is required to have such a high image-forming performance that an optical aberration, particularly, an axial chromatic aberration is further suppressed as compared to a normal optical system.

There are now many cases where high-end models of mobile phones use an optical system with the structure of four elements in four groups.

With a recent increase in number of pixels, even the aforementioned structure provides inadequate performance.

In view of this, it is necessary to study the structure of five elements in five groups.

SUMMARY OF THE INVENTION

However, in an image pickup lens disclosed in Japanese Patent Application Laid-open No. 2003-329925 (hereinafter, referred to as Patent Document 1), fourth and fifth lenses are defined with positive power. Therefore, an optical path length is long. Further, Fno thereof is 3.9, which is dark.

In view of the above-mentioned circumstances, it is desirable to provide an optical unit that has optical characteristics that are equal to or greater than those of an existing unit, delivers more brightness, and can be downsized, and provide an image pickup apparatus.

According to an embodiment of the present invention, there is provided an optical unit including a first lens that is a positive meniscus lens which is convex toward an object side, a diaphragm, a second lens having a positive power, a third lens having a negative power, a fourth lens having a positive power, and a fifth lens having a negative power, which are arranged in the stated order from the object side to an image plane side.

According to another embodiment of the present invention, there is provided an image pickup apparatus including an image pickup element, and an optical unit to form an image of a subject on the image pickup element. The optical unit includes a first lens that is a positive meniscus lens which is convex toward an object side, a diaphragm, a second lens having a positive power, a third lens having a negative power, a fourth lens having a positive power, and a fifth lens having a negative power, which are arranged in the stated order from the object side to an image plane side.

According to the embodiments of the present invention, such advantages are provided that the optical characteristics, which are equal to or greater than those of the existing unit, are provided, more brightness is delivered, and the downsizing can be realized.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the attached drawings.

It should be noted that the description will be given in the following order.

1. First embodiment (First structural example of image pickup lens that uses optical unit)
2. Second embodiment (Second structural example of image pickup lens that uses optical unit)
3. Third embodiment (Structural example of image pickup apparatus)

1. First Embodiment

Figure 1:
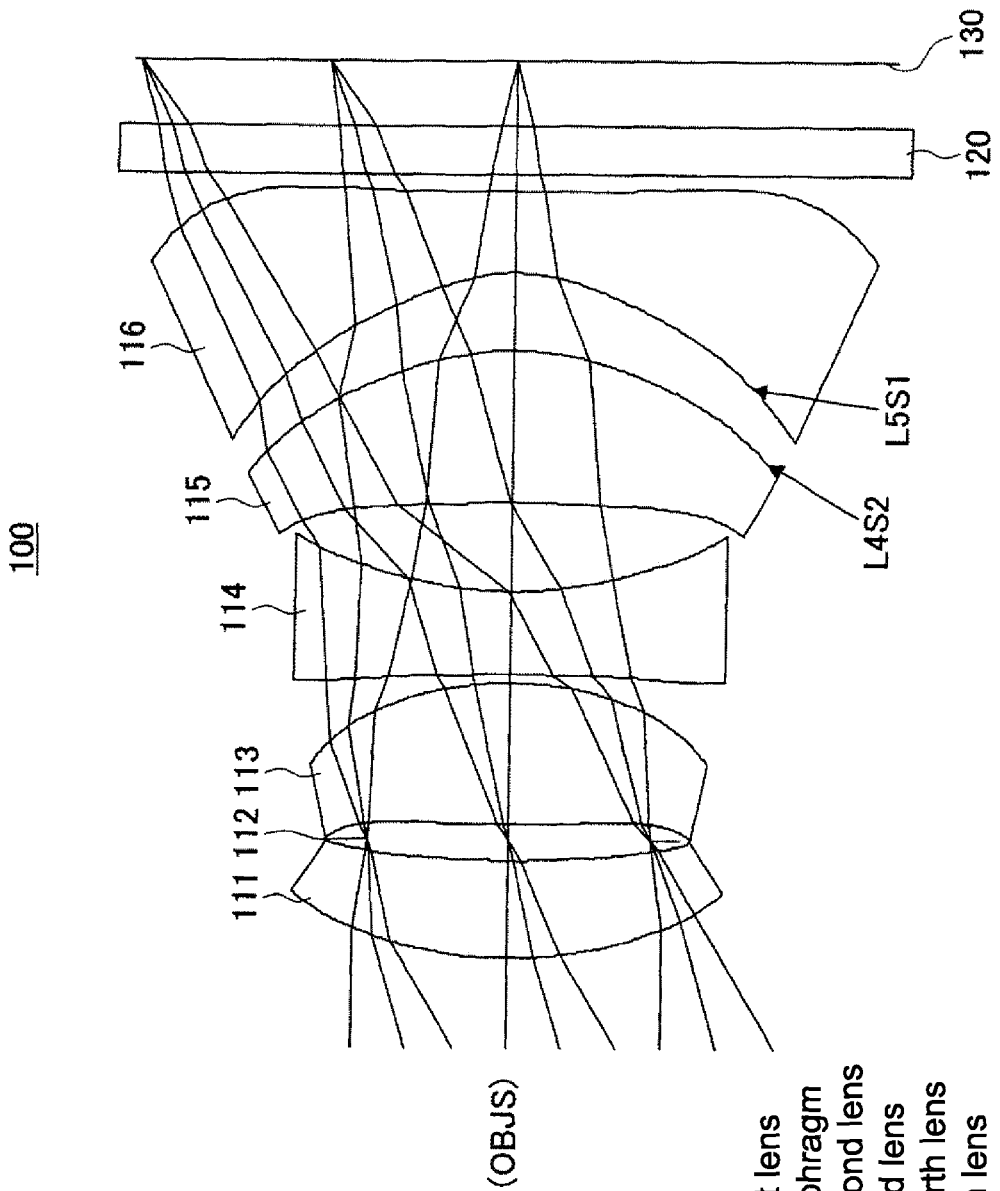
FIG. 1 is a diagram showing a structural example of an image pickup lens according to a first embodiment of the present invention.

FIG. 1 is a diagram showing a structural example of an image pickup lens that uses an optical unit according to a first embodiment of the present invention.

As shown in FIG. 1, an image pickup lens 100 according to the first embodiment includes a first lens 111, a diaphragm 112, a second lens 113, a third lens 114, a fourth lens 115, and a fifth lens 116 that are arranged in the stated order from an object side OBJS toward an image plane side.

The image pickup lens 100 further includes a cover glass 120 and an image plane 130 that are arranged in the stated order from the object side OBJS toward the image plane side.

The image pickup lens 100 is formed as a single focus lens.

Further, in this embodiment, between the first lens 111 and the second lens 113, the diaphragm 112 is disposed.

In the image pickup lens 100 that is the single focus lens, the image plane 130 is intended to provide thereon an imaging area (image reception area) of a solid-state image sensor such as a CCD sensor and a CMOS sensor.

The cover glass 120 is disposed between an image-plane-side surface of the fifth lens 116 and the image plane 130. Between the image-plane-side surface of the fifth lens 116 and the image plane 130, an infrared cutoff filter, a low-pass filter, the cover glass 120 made of a resin or glass, or an optical member may be disposed.

In addition, in the vicinity of the diaphragm, an optical component such as a phase mask, a coded aperture, a liquid crystal shutter, and an adjustable diaphragm may be disposed.

It should be noted that, in FIG. 1, the left side corresponds to the object side (front side) and the right side corresponds to the image plane side (rear side) in this embodiment.

A light flux that is incident on the object side is focused on the image plane 130.

Hereinafter, a description will be given on the structure and effect of the image pickup lens of this embodiment.

The image pickup lens 100 is constituted of the lenses with the structure of five elements in five groups.

The first lens 111 is formed of a positive meniscus lens having a convex surface that is convex toward the object side.

The second lens 113 is formed of a lens having a positive power.

The third lens 114 is formed of a lens having a negative power.

The fourth lens 115 is formed of a lens having a positive power.

The fifth lens 116 is formed of a lens having a negative power.

Here, the first lens 111 has the meniscus shape, so a curvature radius thereof is toward the diaphragm, thereby reducing an off-axis coma aberration and astigmatism.

Next, the diaphragm 112 is disposed, thereby obtaining an optimal structure to shift a pupil position forwards. The second lens 113 having the positive power and a large Abbe number and the third lens 114 having the negative power and a small Abbe number correct a chromatic aberration and extend an effective diameter, thereby providing such an operation that the optical positions of the fourth lens 115 and the fifth lens 116 are caused to approach the diaphragm.

Further, the curvature radiuses of a second surface L4S2 of the fourth lens 115 and a first surface L5S1 of the fifth lens 116 are caused to be closer to an optical diaphragm, thereby reducing the off-axis coma aberration and the astigmatism.

Those operations provide a large aberration correction capability as a whole, which implements a lens that delivers brightness, specifically Fno 2.0.

Further, the image pickup lens 100 of this embodiment, which is the single focus lens, is configured so as to satisfy the following conditional expressions (1) to (9).

The conditional expression (1) is related to the bending of the first lens 111.

As described above, the first lens 111 is formed of the positive meniscus lens that is convex toward the object side, and the centers of the curvature radiuses of a first surface L1S1 and a second surface L1S2 thereof are shifted toward the diaphragm 112 side.

As a result, the off-axis coma aberration and the astigmatism are further corrected.

When the lower limit of the conditional expression (1) is exceeded, the bending is not caused, with the result that the off-axis coma aberration and astigmatism are worsened. When the upper limit thereof is exceeded, the power is weakened, and a form like a retro-focus lens is obtained, with the result that the performance becomes better, but an optical path length becomes longer.

[Expression 1]

$$1 \leq qL1 \leq 100 \quad (1)$$

where qL1 represents a bending factor of the first lens (qL1= (RL1S2+RL1S1)/(RL1S2−RL1S1), where RL1S1 represents the curvature radius of the first surface L1S1 of the first lens 111, and RL1S2 represents the curvature radius of the second surface L1S2 of the first lens 111). The conditional expression (2) is related to the power of the second lens 113. When the lower limit is exceeded, the power becomes too strong, which narrows a manufacture tolerance and makes the productivity poor. When the upper limit is exceeded, the power is weakened, and the degree of correction of the chromatic aberration is lowered, which is not suitable for a high-resolution image sensor.

[Expression 2]

$$0.3 \leq f2/f \leq 10 \quad (2)$$

where f represents the total focal length, and f2 represents a focal length of the second lens 113.

In the conditional expression (3), which is related to the power of the third lens 114, when the lower limit is exceeded, the degree of correction of the chromatic aberration becomes lowered, which is unsuitable for a high-resolution image sensor. When the upper limit is exceeded, the power becomes too strong, which narrows the manufacture tolerance and makes the productivity poor.

[Expression 3]

$$-10 \leq f3/f \leq -0.4 \quad (3)$$

where f represents the total focal length, and f3 represents a focal length of the third lens 114.

The conditional expression (4) is related to the second surface L4S2 of the fourth lens 115.

When the lower limit of the conditional expression (4) is exceeded, the power becomes too strong, which narrows the manufacture tolerance and makes the productivity poor. When the upper limit is exceeded, the off-axis coma aberration and astigmatism are worsened, which is unsuitable for a high-resolution image sensor.

[Expression 4]

$$-3 \leq RL4S2/f \leq -0.08 \quad (4)$$

where f represents the total focal length, and RL4S2 represents the curvature radius of the second surface L4S2 of the fourth lens 115.

The conditional expression (5) is related to the first surface L5S1 of the fifth lens 116.

When the lower limit of the conditional expression (5) is exceeded, the power becomes too strong, which narrows the manufacture tolerance and makes the productivity poor. When the upper limit is exceeded, the off-axis coma aberration and astigmatism are worsened, which is unsuitable for a high-resolution image sensor.

[Expression 4]

$$-3 \leq RL5S1/f \leq -0.05 \quad (5)$$

where f represents the total focal length, and RL5S1 represents the curvature radius of the first surface L5S1 of the fifth lens 116.

In the conditional expression (6), which is related to the Abbe number $vL1$ of the first lens 111, when the lower limit is exceeded, the chromatic aberration is deteriorated, and the entire resolution is lowered. When the upper limit is exceeded, the cost of a material is increased, which does not serve the purpose of this case.

[Expression 6]

$$40 \leq vL1 \leq 70 \quad (6)$$

In the conditional expression (7), which is related to the Abbe number $vL2$ of the second lens 113, when the lower limit is exceeded, the chromatic aberration is deteriorated, and the entire resolution is lowered. When the upper limit is exceeded, the cost of a material is increased, which does not serve the purpose of this case.

[Expression 7]

$$40 \leq vL2 \leq 70 \quad (7)$$

In the conditional expression (8), which is related to the Abbe number $vL3$ of the third lens 114, when the lower limit is exceeded, the cost of a material is increased, which does not serve the purpose of this case. When the upper limit is exceeded, the chromatic aberration is deteriorated, and the entire resolution is lowered.

[Expression 8]

$$10 \leq vL3 \leq 40 \quad (8)$$

In the conditional expression (9), which is related to a total optical length TT, when the upper limit is exceeded, a compact application is difficult. When the lower limit is exceeded, the manufacture tolerance is not obtained, which makes the manufacture impossible. Thus, this condition is an optimal condition.

[Expression 9]

$$0.8 \leq TT/f \leq 5 \quad (9)$$

where TT represents the total optical length, and f represents the total focal length.

The conditional expressions (1) to (9) are common to examples 1 and 2 described below, and are used as appropriate, thereby realizing a compact optical system and a more desirable image forming performance suitable for an individual image pickup sensor or image pickup apparatus.

It should be noted that the shape of an aspheric surface of the lens is expressed by the following expression, with a direction from the object toward the image plane being set as a positive direction.

Aspheric Surface Equation:

$$X = cy^2/1 + \sqrt{1-(1+k)c^2y^2} + Ay^4 + By^6 + Cy^8 + Dy^{10}$$

where k represents a conic coefficient, A, B, C, and D each represent an aspheric surface coefficient, r represents the center curvature radius. Further, y represents the height of a light beam from an optical axis, and c represents an inverse (1/r) of the center curvature radius r.

Furthermore, in the aspheric surface equation, X represents a distance from a tangent plane to the top of the aspherical surface, A represents a fourth-degree aspheric surface coefficient, B represents a sixth-degree aspheric surface coefficient, C represents an eighth-degree aspheric surface coefficient, and D represents a tenth-degree aspheric surface coefficient.

Figure 2:
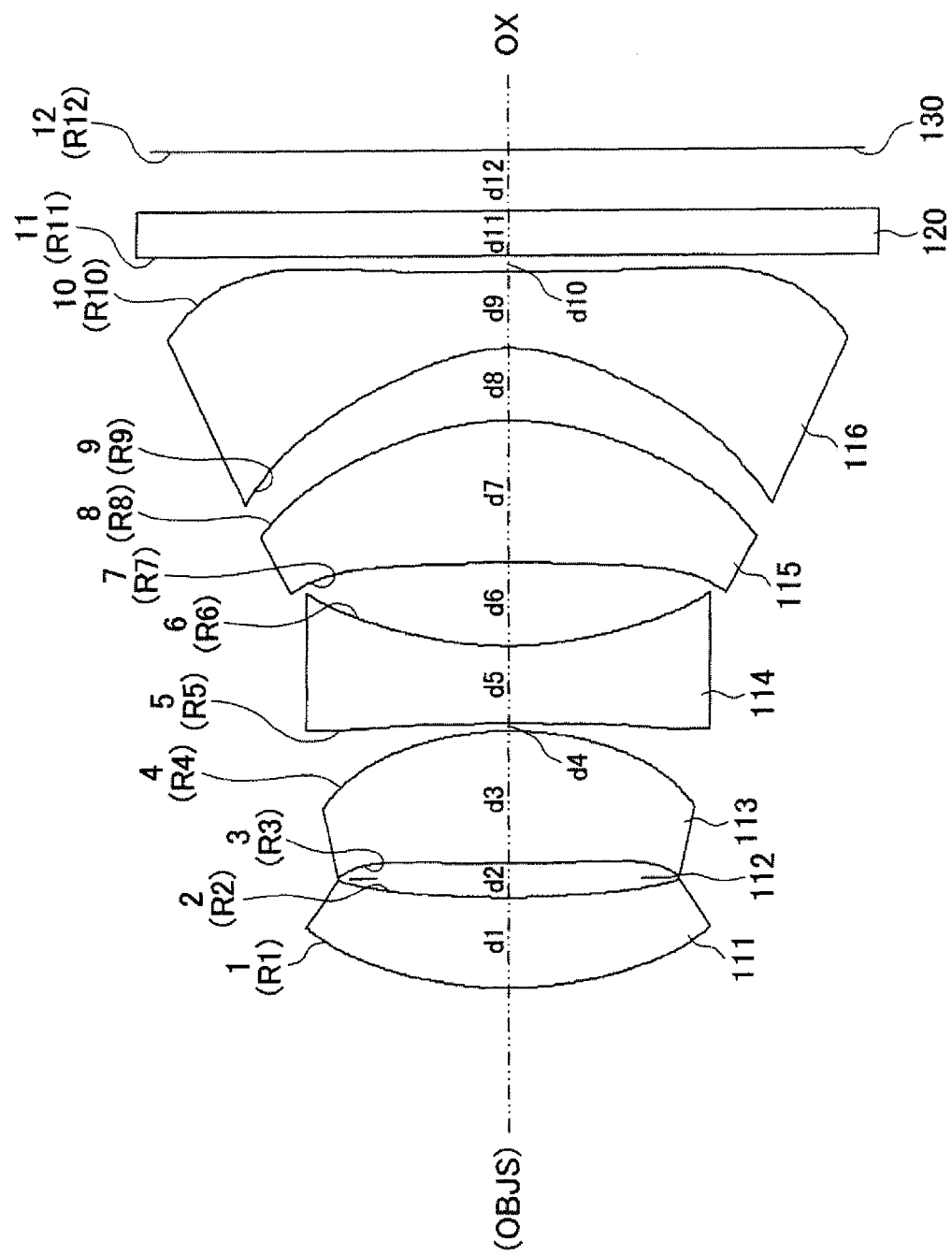
FIG. 2 is a diagram showing surface numbers given to lenses that constitute lens groups of the image pickup lens according to the first embodiment, to a cover glass that forms an image pickup unit, and to an image plane.

FIG. 2 is a diagram showing surface numbers given to the lenses that constitute the lens groups of the image pickup lens according to this embodiment, to the cover glass that forms the image pickup unit, and to the image plane.

It should be noted the diaphragm 112 is not considered in the drawing.

Specifically, the surface numbers of 1 and 2 are given to the object-side surface (convex surface) and the image-plane-side surface of the first lens 111, respectively.

The surface numbers of 3 and 4 are given to the object-side surface and the image-plane-side surface of the second lens 113, respectively.

The surface numbers of 5 and 6 are given to the object-side surface and the image-plane-side surface of the third lens 114, respectively.

The surface numbers of 7 and 8 are given to the object-side surface and the image-plane-side surface of the fourth lens 115, respectively.

The surface numbers of 9 and 10 are given to the object-side surface and the image-plane-side surface of the fifth lens 116, respectively.

The surface number of 11 is given to the object-side surface of the cover glass 120, and the surface number of 12 is given to the image plane 130.

In addition, as shown in FIG. 2, in the image pickup lens 100 according to this embodiment, the center curvature radius of the object-side surface (No. 1) of the first lens 111 is set as R1, and the center curvature radius of the image-plane-side surface thereof is set as R2.

The center curvature radius of the object-side surface of the second lens 113 is set as R3, and the center curvature radius of the image-plane-side surface thereof is set as R4.

The center curvature radius of the object-side surface of the third lens 114 is set as R5, and the center curvature radius of the image-plane-side surface thereof is set as R6.

The center curvature radius of the object-side surface of the fourth lens 115 is set as R7, and the center curvature radius of the image-plane-side surface thereof is set as R8.

The center curvature radius of the object-side surface of the fifth lens 116 is set as R9, and the center curvature radius of the image-plane-side surface thereof is set as R10.

The center curvature radius of an object-side surface 11 of the cover glass 120 is set as R11.

The center curvature radius of a surface 12 of the image plane 130 is set as R12.

It should be noted that the center curvature radius R11 of the surface 11 and the center curvature radius R12 of the surface 12 are infinite (INFINITY).

Further, as shown in FIG. 2, a distance between a surface 1 and a surface 2 on an optical axis OX, which corresponds to the thickness of the first lens 111, is set as d1, and a distance between the image-plane-side surface 2 of the first lens 111 and an object-side surface 3 of the second lens 113 on the optical axis OX is set as d2.

A distance between the surface 3 and a surface 4 on the optical axis OX, which corresponds to the thickness of the second lens 113, is set as d3, and a distance between the image-plane-side surface 4 of the second lens 113 and an object-side surface 5 of the third lens 114 on the optical axis OX is set as d4.

A distance between the surface 5 and a surface 6 on the optical axis OX, which corresponds to the thickness of the third lens 114, is set as d5, and a distance between the image-plane-side surface 6 of the third lens 114 and an object-side surface 7 of the fourth lens 115 on the optical axis OX is set as d6.

A distance between the surface 7 and a surface 8 on the optical axis OX, which corresponds to the thickness of the fourth lens 115, is set as d7, and a distance between the image-plane-side surface 8 of the fourth lens 115 and an object-side surface 9 of the fifth lens 116 on the optical axis OX is set as d8.

A distance between the surface 9 and a surface 10 on the optical axis OX, which corresponds to the thickness of the fifth lens 116, is set as d9, and a distance between the image-plane-side surface 10 of the fifth lens 116 and the object-side surface 11 of the cover glass 120 on the optical axis OX is set as d10.

A distance between the object-side surface 11 and an image-plane-side surface of the cover glass 120 on the optical axis OX, which corresponds to the thickness of the cover glass 120, is set as d11.

A distance between the image-plane-side surface of the cover glass 120 and the surface 12 of the image plane 130 on the optical axis OX is set as d12.

In the following, the examples 1 and 2 will be described. In the examples 1 and 2, shown are design examples of an image pickup lens for a CMOS imager for ¼ size, 1.1 m pitch, and 8 m.

Hereinafter, the example 1 is shown in which specific numerical values of the image pickup lens are indicated. It should be noted that, in the example 1, the same surface numbers as shown in FIG. 2 are given to the lenses of the image pickup lens 100, to the cover glass 120 that forms the image pickup unit, and the image plane 130.

In this design example, the lenses except the fourth lens 115 can be formed of plastic lenses, which makes it possible to manufacture the lenses at low cost. Further, the convex fourth lens 115 is formed of glass, thereby obtaining a desirable balance of the powers of the other lenses and excellent temperature characteristics with less temperature dependency of the total focal length.

Example 1

Tables 1, 2, 3, and 4 show numerical values of the example 1. The numerical values of the example 1 correspond to the image pickup lens 100 shown in FIG. 1.

The table 1 shows the curvature radiuses (R: mm), distances (d: mm), refractive indexes (nd), and variance values (vd) of the lenses, the cover glass, and the image plane that correspond to the surface numbers of the image pickup lens in the example 1.

TABLE 1

Example 1, lens structure data

| Surface No. | R | d | nd | vd |
|---|---|---|---|---|
| 1 | 2.567 | 0.597 | 1.531 | 56.0 |
| 2 | 7.004 | 0.220 | | |
| 3 | 8.844 | 0.868 | 1.531 | 56.0 |
| 4 | −2.099 | 0.050 | | |
| 5 | −57.908 | 0.508 | 1.632 | 23.0 |
| 6 | 2.275 | 0.548 | | |
| 7 | −17.797 | 0.931 | 1.807 | 40.9 |
| 8 | −1.690 | 0.477 | | |
| 9 | −1.045 | 0.500 | 1.531 | 56.0 |
| 10 | −1100.000 | 0.100 | | |
| 11 | INFINITY | 0.300 | 1.517 | 64.2 |
| 12 | INFINITY | 0.400 | | |

Table 2 shows fourth-, sixth-, eighth-, and tenth-degree aspheric coefficients of the surfaces 1 and 2 of the first lens 111, the surfaces 3 and 4 of the second lens 113, the surfaces 5 and 6 of the third lens 114, the surfaces 7 and 8 of the fourth lens 115, and the surfaces 9 and 10 of the fifth lens 116 in the example 1.

In the table 2, K represents a conic constant, A represents the fourth-degree aspheric surface coefficient, B represents the sixth-degree aspheric surface coefficient, C represents the eighth-degree aspheric surface coefficient, and D represents the tenth-degree aspheric surface coefficient.

TABLE 2

Example 1, aspheric surface data

| First surface | K: 1.690 | A: −0.1421E−01 | B: −0.172E−02 | C: 0.160E−02 | D: 0.109E−02 |
|---|---|---|---|---|---|
| Second surface | K: 10.000 | A: −0.429E−02 | B: −0.309E−03 | C: 0.217E−01 | D: −0.721E−02 |
| Third surface | K: −1.339 | A: −0.440E−01 | B: −0.3460E−01 | C: 0.294E−01 | D: −0.366E−01 |
| Fourth surface | K: −1.765 | A: −0.3926E−01 | B: −0.236E−01 | C: 0.110E−01 | D: −0.116E−01 |
| Fifth surface | K: −10.0 | A: −0.517E−01 | B: 0.313E−01 | C: −0.109E−01 | D: 0.461E−02 |
| Sixth surface | K: −0.0137 | A: −0.564E−01 | B: 0.326E−01 | C: −0.159E−01 | D: 0.548E−02 |
| Seventh surface | K: 10.000 | A: −0.188E−01 | B: 0.127E−01 | C: −0.110E−01 | D: −0.214E−03 |
| Eighth surface | K: −4.062 | A: −0.4640E−01 | B: 0.298E−01 | C: −0.147E−01 | D: 0.172E−02 |
| Ninth surface | K: −1.339 | A: 0.181E+00 | B: −0.116E+00 | C: 0.304E−01 | D: −0.352E−02 |
| Tenth surface | K: 10.000 | A: 0.407E−01 | B: −0.2456E−01 | C: 0.405E−02 | D: −0.313E−03 |

Table 3 specifically shows the focal length f, a numerical aperture F, a half field angle ω, and a lens length H of the image pickup lens 100 in the example 1.

Here, the focal length f is set to 3.89 (mm), the numerical aperture F is set to 2.0, the half field angle ω is set to 30.5 deg, and the lens length H is set to 5.5 (mm).

TABLE 3

| Example 1, structure data |
|---|
| f (focal length) = 3.89 mm |
| F (numerical aperture) = 2.0 |
| ω (half field angle) = 30.5 deg |
| H (total lens length) = 5.5 mm |

Table 4 shows that the conditional expressions (1) to (9) are satisfied in the example 1.

TABLE 4

Example 1, values of conditional expressions

| Conditional expressions | | Example 1 |
|---|---|---|
| (1) | qL1 | 4.08 |
| (2) | f2/f | 0.87 |
| (3) | f3/f | −1.15 |
| (4) | RL4S2/f | −0.28 |
| (5) | RL5S1/f | −0.22 |
| (6) | vL1 | 56.0 |
| (7) | vL2 | 56.0 |
| (8) | vL3 | 23.0 |
| (9) | TT/f | 1.40 |

As shown in the table 4, in the example 1, the bending factor qL1 of the first lens 111 is set to 4.08, which satisfies the condition defined by the conditional expression (1).

The power f2/f of the second lens 113 is set to 0.87, which satisfies the condition defined by the conditional expression (2).

The power f3/f of the third lens 114 is set to −1.15, which satisfies the condition defined by the conditional expression (3).

RL4S2/f is set to −0.28, which satisfies the condition defined by the conditional expression (4).

RL5S1/f is set to −0.22, which satisfies the condition defined by the conditional expression (5).

The Abbe number vL1 of the first lens 111 is set to 56.0, which satisfies the condition defined by the conditional expression (6).

The Abbe number vL2 of the second lens 113 is set to 56.0, which satisfies the condition defined by the conditional expression (7).

The Abbe number vL3 of the third lens 114 is set to 23.0, which satisfies the condition defined by the conditional expression (8).

The limiting condition TT/f to the total optical length TT is set to 1.902, which satisfies the condition defined by the conditional expression (9).

Figure 3:
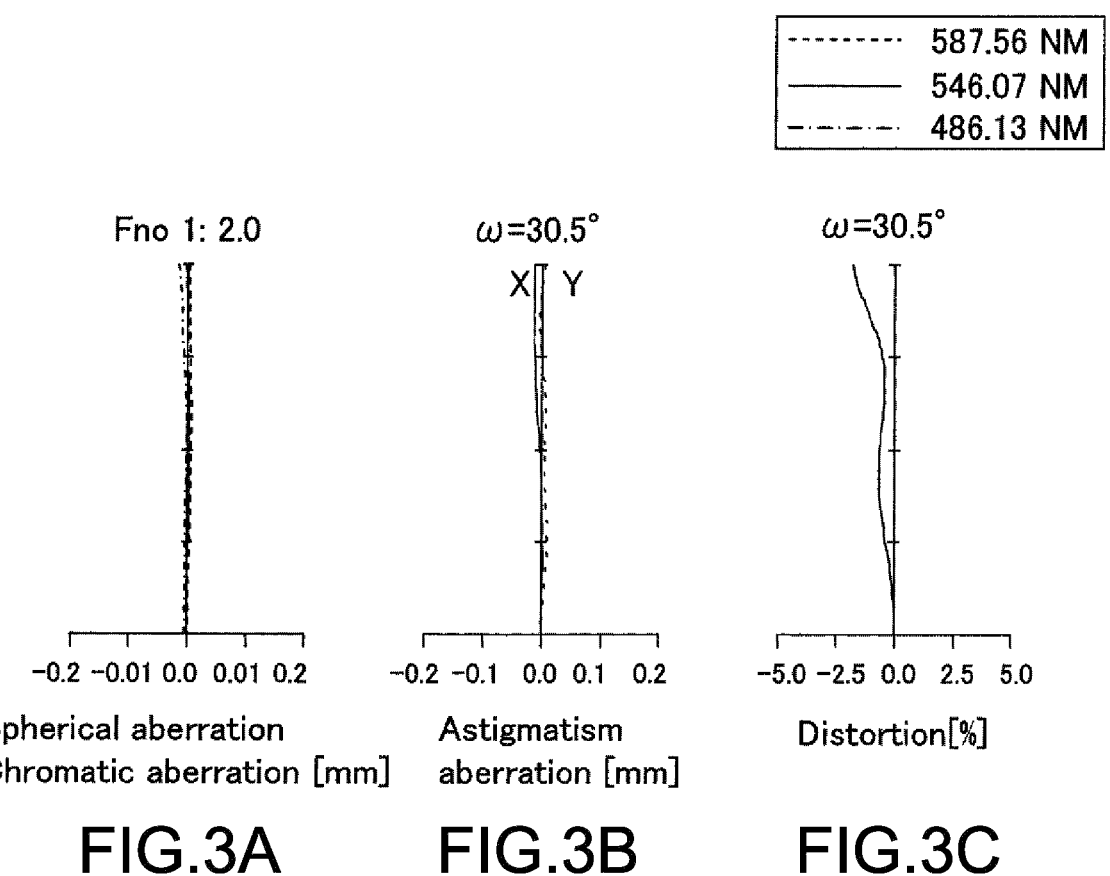
FIG. 3 are aberration diagrams showing a spherical aberration, astigmatism, and distortion, respectively, in an example 1.

FIG. 3 are aberration diagrams showing the spherical aberration (chromatic aberration), the astigmatism, and distortion, respectively, in the example 1. FIG. 3A shows the spherical aberration (chromatic aberration), FIG. 3B shows the astigmatism, and FIG. 3C shows the distortion.

As shown in FIGS. 3A to 3C, according to the example 1, the spherical aberration, the astigmatism, and the distortion are desirably corrected, with the result that an image pickup lens provided with an optical unit that is excellent in image-forming performance is obtained.

2. Second Embodiment

Figure 4:
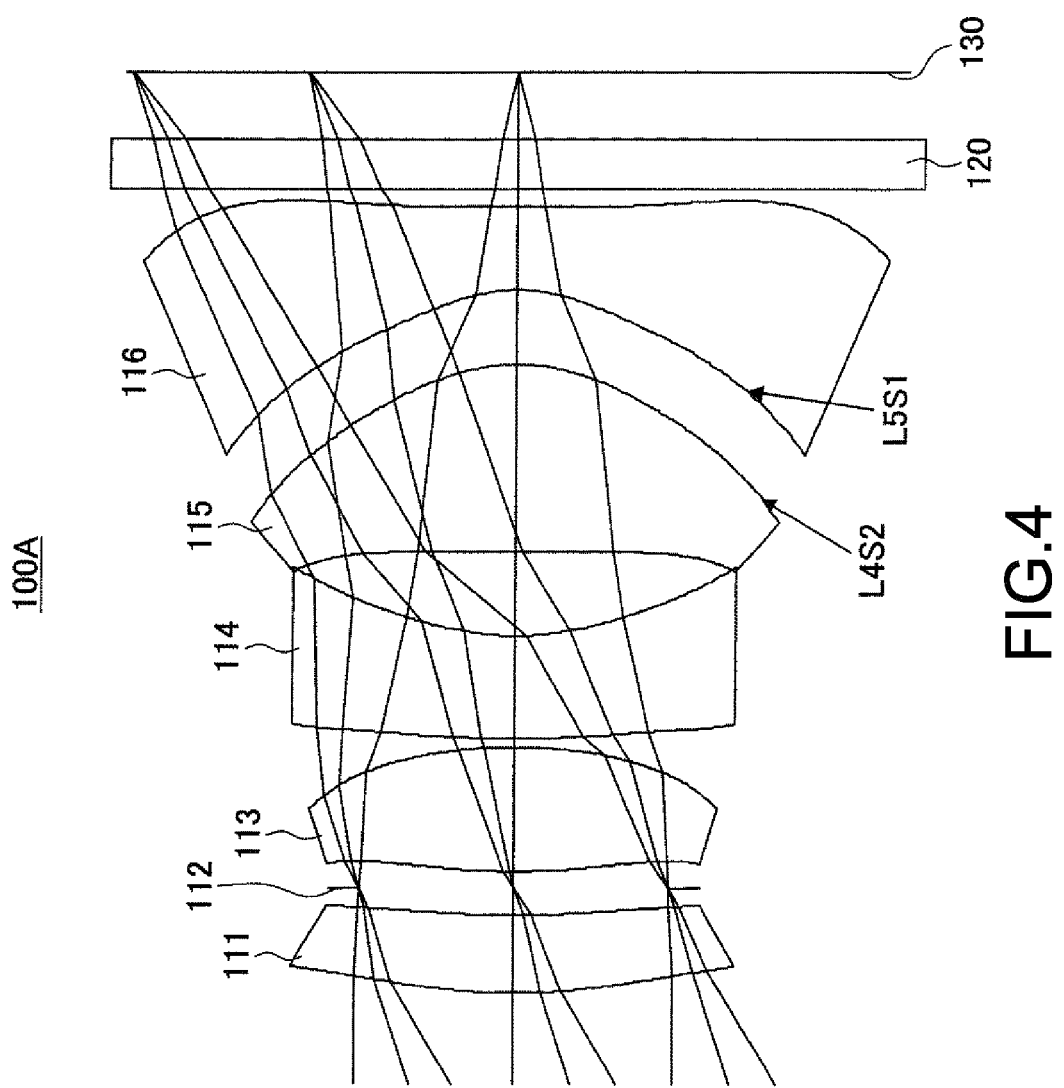
FIG. 4 is a diagram showing a structural example of an image pickup lens according to a second embodiment of the present invention.

FIG. 4 is a diagram showing a structural example of an image pickup lens according to a second embodiment of the present invention.

An image pickup lens 100A shown in FIG. 4 according to the second embodiment basically has the same structure as the image pickup lens 100 according to the first embodiment. As described below as an example 2, only set values such as parameters of the constituents are different.

Therefore, a detailed description of the image pickup lens 100A will be omitted.

In the following, the example 2 is shown in which specific numerical values of the image pickup lens are indicated. It should be noted that in the example 2, the same surface numbers as shown in FIG. 2 are given to the lenses of the image pickup lens 100A, the cover glass 120 that forms the image pickup unit, and the image plane 130.

Example 2

Tables 5, 6, 7, and 8 show numerical values of the example 2. The numerical values of the example 2 correspond to the image pickup lens 100A shown in FIG. 4.

The table 5 shows the curvature radiuses (R: mm), distances (d: mm), refractive indexes (nd), and variance values (vd) of the lenses, the cover glass, and the image plane that correspond to the surface numbers of the image pickup lens in the example 2.

TABLE 5

Example 2, lens structure data

| Surface No. | R | d | nd | vd |
|---|---|---|---|---|
| 1 | 3.683 | 0.465 | 1.531 | 56.0 |
| 2 | 6.069 | 0.260 | | |
| 3 | 4.307 | 0.746 | 1.531 | 56.0 |
| 4 | −2.951 | 0.050 | | |
| 5 | 5.465 | 0.613 | 1.632 | 23.0 |
| 6 | 1.808 | 0.499 | | |
| 7 | 74.074 | 1.117 | 1.531 | 56.0 |
| 8 | −1.080 | 0.450 | | |
| 9 | −0.873 | 0.500 | 1.531 | 56.0 |
| 10 | −1100.000 | 0.100 | | |
| 11 | INFINITY | 0.300 | 1.517 | 64.2 |
| 12 | INFINITY | 0.400 | | |

Table 6 shows fourth-, sixth-, eighth-, and tenth-degree aspheric coefficients of the surfaces 1 and 2 of the first lens 111, the surfaces 3 and 4 of the second lens 113, the surfaces 5 and 6 of the third lens 114, the surfaces 7 and 8 of the fourth lens 115, and the surfaces 9 and 10 of the fifth lens 116 in the example 2.

In the table 6, K represents a conic constant, A represents the fourth-degree aspheric surface coefficient, B represents the sixth-degree aspheric surface coefficient, C represents the eighth-degree aspheric surface coefficient, and D represents the tenth-degree aspheric surface coefficient.

TABLE 6

Example 2, aspheric surface data

| First surface | K: −0.455 | A: −0.243E−01 | B: −0.973E−02 | C: 0.104E−01 | D: −0.336E−02 |
|---|---|---|---|---|---|
| Second surface | K: −10.000 | A: −0.310E−01 | B: −0.107E−01 | C: 0.283E−01 | D: −0.129E−01 |
| Third surface | K: 3.473 | A: −0.344E−01 | B: −0.329E−01 | C: 0.325E−01 | D: −0.276E−01 |
| Fourth surface | K: −3.210 | A: −0.321E−01 | B: −0.196E−01 | C: 0.107E−01 | D: −0.109E−01 |
| Fifth surface | K: −10.000 | A: −0.482E−01 | B: 0.205E−01 | C: −0.730E−02 | D: 0.355E−02 |
| Sixth surface | K: −0.439 | A: −0.667E−01 | B: 0.252E−01 | C: −0.994E−02 | D: 0.369E−02 |
| Seventh surface | K: 10.000 | A: −0.401E−01 | B: 0.281E−01 | C: −0.272E−01 | D: 0.482E−02 |
| Eighth surface | K: −3.056 | A: −0.4947E−01 | B: 0.305E−01 | C: −0.196E−01 | D: 0.313E−02 |
| Ninth surface | K: −2.744 | A: 0.139E+00 | B: −0.127E+00 | C: 0.406E−01 | D: −0.515E−02 |
| Tenth surface | K: −10.000 | A: 0.509E−01 | B: −0.297E−01 | C: 0.522E−02 | D: −0.383E−03 |

Table 7 specifically shows the focal length f, a numerical aperture F, a half field angle ω, and a lens length H of the image pickup lens 100A in the example 2.

Here, the focal length f is set to 3.92 (mm), the numerical aperture F is set to 2.0, the half field angle ω is set to 30.4 deg, and the lens length H is set to 5.5 (mm).

TABLE 7

Example 2, structure data f (focal length) = 3.92 mm
F (numerical aperture) = 2.0
ω (half field angle) = 30.4 deg
H (total lens length) = 5.5 mm Table 8 shows that the conditional expressions (1) to (9) are satisfied in the example 2.

TABLE 8

Example 2, values of conditional expressions

| Conditional expressions | | Example 2 |
|---|---|---|
| (1) | qL1 | 2.16 |
| (2) | f2/f | 0.84 |
| (3) | f3/f | −0.88 |
| (4) | RL4S2/f | −0.43 |
| (5) | RL5S1/f | −0.27 |
| (6) | νL1 | 56.0 |
| (7) | νL2 | 56.0 |
| (8) | νL3 | 23.0 |
| (9) | TT/f | 1.41 |

As shown in the table 8, in the example 2, the bending factor qL1 of the first lens 111 is set to 2.16, which satisfies the condition defined by the conditional expression (1).

The power f2/f of the second lens 113 is set to 0.84, which satisfies the condition defined by the conditional expression (2).

The power f3/f of the third lens 114 is set to −0.88, which satisfies the condition defined by the conditional expression (3).

RL4S2/f is set to −0.43, which satisfies the condition defined by the conditional expression (4).

RL5S1/f is set to −0.27, which satisfies the condition defined by the conditional expression (5).

The Abbe number νL1 of the first lens 111 is set to 56.0, which satisfies the condition defined by the conditional expression (6).

The Abbe number νL2 of the second lens 113 is set to 56.0, which satisfies the condition defined by the conditional expression (7).

The Abbe number νL3 of the third lens 114 is set to 23.0, which satisfies the condition defined by the conditional expression (8).

The limiting condition TT/f to the total optical length TT is set to 1.41, which satisfies the condition defined by the conditional expression (9).

Figure 5:
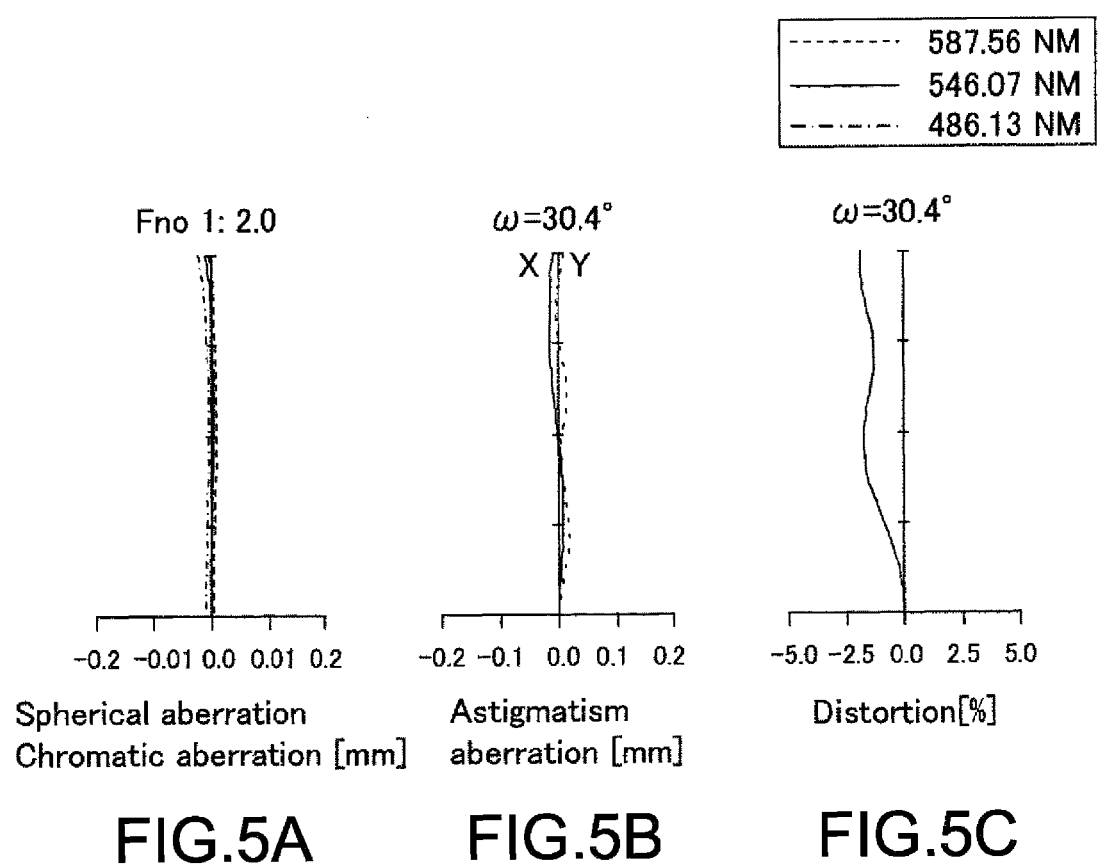
FIG. 5 are aberration diagrams showing a spherical aberration, astigmatism, and distortion, respectively, in an example 2.

FIG. 5 are aberration diagrams showing the spherical aberration (chromatic aberration), the astigmatism, and distortion, respectively, in the example 2. FIG. 5A shows the spherical aberration (chromatic aberration), FIG. 5B shows the astigmatism, and FIG. 5C shows the distortion.

As shown in FIGS. 5A to 5C, according to the example 2, the spherical aberration, the astigmatism, and the distortion are desirably corrected, with the result that an image pickup lens provided with an optical unit that is excellent in image-forming performance is obtained.

According to this embodiment described above, the following effect can be obtained.

With the image pickup lens 100A of this embodiment, it is possible to provide an optical apparatus that has optical characteristics that are equal to or greater than those of an optical apparatus in related art, delivers more brightness, and is capable of being downsized.

With the structure of five elements in five groups, the first lens 111 is formed of the positive meniscus lens that is convex toward the object side, and can desirably correct the off-axis coma aberration and the astigmatism.

In addition, the first lens 111 is formed of the lens having the large Abbe number, which can reduce the chromatic aberration.

The second lens 113 has the positive power and has the large Abbe number. The third lens 114 has the negative power and has the small Abbe number. With those structures, the chromatic aberration is reduced, and the effective diameter is extended, with the result that the structure that is adaptable to a large imager can be obtained.

The curvature radiuses of the second surface L4S2 of the fourth lens 115 having the positive power and the first surface L5S1 of the first surface of the fifth lens 116 are shifted to the vicinity of the optical diaphragm, with the result that the off-axis coma aberration and the astigmatism can be desirably corrected.

Those operations can implement a lens that has a significant aberration correction capability as a whole, and delivers significant brightness.

Those five lenses can be formed of plastic-molded lenses.

With those lenses, it is possible to implement a significantly high-performance optical unit that delivers brightness, has a wide angle, has a short optical path length, and is compact. Further, the optical unit is inexpensive and provides high productivity.

The image pickup lenses 100 and 100A having the characteristics described above can be applied as a lens for a digital camera that uses an image sensor such as a CCD and a CMOS sensor, in particular, a lens for a camera that is mounted on a small electronic apparatus such as a mobile phone.

3. Third Embodiment

Figure 6:
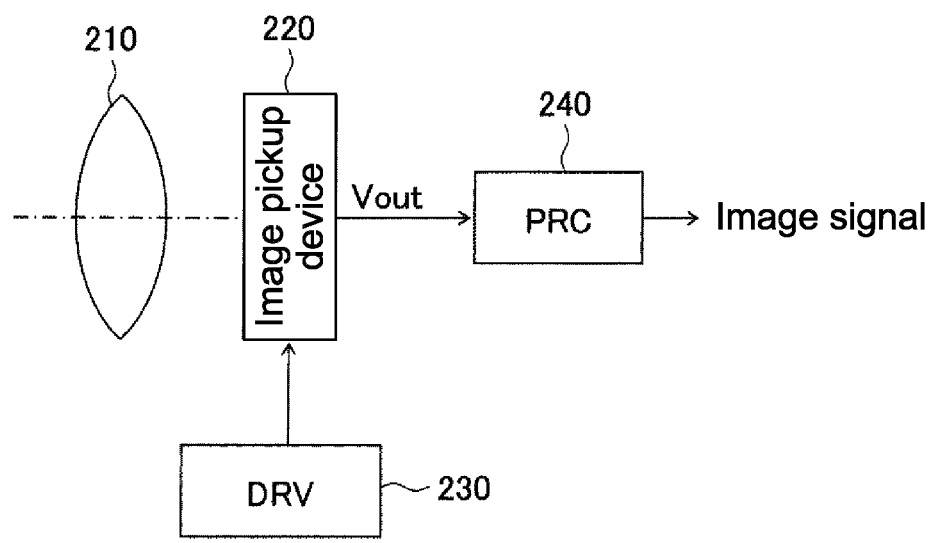
FIG. 6 is a block diagram showing a structural example of an image pickup apparatus that uses an image pickup lens including an optical unit according to a third embodiment.

FIG. 6 is a block diagram showing a structural example of an image pickup apparatus that uses an image pickup lens including an optical unit according to this embodiment.

As shown in FIG. 6, an image pickup apparatus 200 includes an optical system 210 and an image pickup device 220. To the optical system 210, the image pickup lens 100 or 100A according to this embodiment is applied. To the image pickup device 220, a CCD or a CMOS image sensor (solid-state image sensor) can be applied.

The optical system 210 guides incident light to an image pickup surface including a pixel area of the image pickup device 220, and forms an image of a subject thereon.

The image pickup apparatus 200 further includes a drive circuit (DRV) 230 that drives the image pickup device 220 and a signal processing circuit (PRC) 240 that processes an output signal from the image pickup device 220.

The drive circuit 230 includes a timing generator (not shown) that generates various timing signals including a clock pulse and a start pulse for driving a circuit in the image pickup device 220, and drives the image pickup device 220 with a predetermined timing signal.

In addition, the signal processing circuit 240 subjects a predetermined signal processing to the output signal from the image pickup device 220.

An image signal that is processed by the signal processing circuit 240 is recorded on a recording medium such as a memory. A hard copy of the image information recorded on the recording medium is obtained with a printer or the like. Further, the image signal processed by the signal processing circuit 240 is displayed as a moving image on a monitor formed of a liquid crystal display or the like.

As described above, as the optical system 210, the image pickup lens 100 or 100A is mounted on the image pickup apparatus such as a digital still camera, with the result that a high-precision camera with low power consumption can be implemented.

The present application contains subject matter related to that disclosed in Japanese Priority Patent Application JP 2009-291917 filed in the Japan Patent Office on Dec. 24, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical unit, comprising:
a first lens that is a positive meniscus lens which is convex toward an object side;
a diaphragm;
a second lens having a positive power;
a third lens having a negative power;
a fourth lens having a positive, power; and
a fifth lens having a negative power,
wherein,
the first lens, the diaphragm, the second lens, the third lens, the fourth lens, and the fifth lens are arranged in that order from the object side to an image plane side, the fifth lens has a first surface, a curvature radius of which satisfies the following conditional expression:

$$-3 \leq RL5S1/f \leq -0.05,$$

where f represents a total focal length, and RL5S1 represents the curvature radius of the first surface of the fifth lens, and
the first surface of the fifth lens is spaced from the fourth lens along an optical axis.

2. The optical unit according to claim 1, wherein the first lens has a bending factor that satisfies the following conditional expression:

$$1 \leq qL1 \leq 100,$$

where qL1 represents the bending factor of the first lens and is expressed as follows:

$$qL1=(RL1S2+RL1S1)/(RL1S2-RL1S1),$$

where RL1S1 represents a curvature radius of a first surface of the first lens, and RL1S2 represents a curvature radius of a second surface of the first lens.

3. The optical unit according to claim 1, wherein the second lens satisfies the following conditional expression:

$$0.3 \leq f2/f \leq 10,$$

where f represents a total focal length, and f2 represents a focal length of the second lens.

4. The optical unit according to claim 1, wherein the third lens satisfies the following conditional expression:

$$-10 \leq f3/f \leq -0.4,$$

where f represents a total focal length, and f3 represents a focal length of the third lens.

5. The optical unit according to claim 1, wherein the fourth lens has a second surface, a curvature radius of which satisfies the following conditional expression:

$$-3 \leq RL4S2/f \leq -0.08,$$

where f represents a total focal length, and RL4S2 represents the curvature radius of the second surface of the fourth lens.

6. The optical unit according to claim 1, wherein the first lens, the second lens, and the third lens have Abbe numbers of vL1, vL2, and vL3, respectively, which satisfy the following conditional expressions:

$$40 \leq vL1 \leq 70,$$

$$40 \leq vL2 \leq 70, \text{ and}$$

$$10 \leq vL3 \leq 40.$$

7. The optical unit according to claim 1, wherein a total optical length satisfies the following conditional expression:

$$0.8 \leq TT/f \leq 5,$$

where f represents a total focal length, and TT represents the total optical length.

8. An image pickup apparatus, comprising:
an image pickup element; and
an optical unit to form an image of a subject on the image pickup element, the optical unit including
(i) a first lens that is a positive meniscus lens which is convex toward an object side,
(ii) a diaphragm,
(iii) a second lens having a positive power,
(iv) a third lens having a negative power,
(v) a fourth lens having a positive power, and
(vi) a fifth lens having a negative power, wherein,
the first lens, the diaphragm, the second lens, the third lens, the fourth lens, and the fifth lens are arranged in that order from the object side to an image plane side,
the fifth lens has a first surface, a curvature radius of which satisfies the following conditional expression:

$$-3 \leq RL5S1/f \leq -0.05,$$

where f represents a total focal length, and RL5S1 represents the curvature radius of the first surface of the fifth lens, and
the first surface of the fifth lens is spaced from the fourth lens along an optical axis.

9. An optical unit, comprising:
a first lens that is a positive meniscus lens which is convex toward an object side;
a diaphragm;
a second lens having a positive power;
a third lens having a negative power;
a fourth lens having a positive power; and
a fifth lens having a negative power,
wherein,
the first lens, the diaphragm, the second liens, the third lens, the fourth lens, and the fifth lens are arranged in that order from the object side to an image plane side,
the first lens, the second lens, and the third lens have Abbe numbers of vL1, vL2, and vL3, respectively, which satisfy the following conditional expressions:

$$40 \leq vL1 \leq 70,$$

$$40 \leq vL2 \leq 70, \text{ and}$$

$$10 \leq vL3 \leq 40, \text{ and}$$

the fifth lens has a first surface, the first surface of the fifth lens being spaced from the fourth lens along an optical axis.

10. The optical unit according to claim 9, wherein the first lens has a bending factor that satisfies the following conditional expression:

$$1 \leq qL1 \leq 100,$$

where qL1 represents the bending factor of the first lens and is expressed as follows:

$$qL1=(RL1S2+RL1S1)/(RL1S2-RL1S1),$$

where RL1S1 represents a curvature radius of a first surface of the first lens, and RL1S2 represents a curvature radius of a second surface of the first lens.

11. The optical unit according to claim 9, wherein the second lens satisfies the following conditional expression:

$$0.3 \leq f2/f \leq 10,$$

where f represents a total focal length, and f2 represents a focal length of the second lens.

12. The optical unit according to claim 9, wherein the third lens satisfies the following conditional expression:

$$-10 \leq f3/f \leq -0.4,$$

where f represents a total focal length, and f3 represents a focal length of the third lens.

13. The optical unit according to claim 9, wherein the fourth lens has a second surface, a curvature radius of which satisfies the following conditional expression:

$$-3 \leq RL4S2/f \leq -0.08,$$

where f represents a total focal length, and RL4S2 represents the curvature radius of the second surface of the fourth lens.

14. The optical unit according to claim 9, wherein a curvature radius of the first surface of the fifth lens satisfies the following conditional expression:

$$-3 \leq RL5S1/f \leq -0.05,$$

where f represents a total focal length, and RL5S1 represents the curvature radius of the first surface of the fifth lens.

15. The optical unit according to claim 9, wherein a total optical length satisfies the following conditional expression:

$$0.8 \leq TT/f \leq 5,$$

where f represents a total focal length, and TT represents the total optical length.

16. An image pickup apparatus, comprising:
an image pickup element; and
an optical unit to form an image of a subject on the image pickup element, the optical unit including
(i) a first lens that is a positive meniscus lens which is convex toward an object side,
(ii) a diaphragm,
(iii) a second lens having a positive power,
(iv) a third lens having a negative power,
(v) a fourth lens having a positive power, and
(vi) a fifth liens having a negative power,
wherein,
the first lens, the diaphragm, the second lens, the third lens, the fourth lens, and the fifth lens are arranged in that order from the object side to an image plane side,
the first lens, the second lens, and the third lens have Abbe numbers of vL1, vL2, and vL3, respectively, which satisfy the following conditional expressions:

$$40 \leq vL1 \leq 70,$$

$$40 \leq vL2 \leq 70, \text{ and}$$

$$10 \leq vL3 \leq 40, \text{ and}$$

the fifth lens has a first surface, the first surface of the fifth lens being spaced from the fourth lens along an optical axis.

17. An optical unit, comprising:
a first lens that is a positive meniscus lens which is convex toward an object side;
a diaphragm;
a second lens having a positive power;
a third lens having a negative power;
a fourth lens having a positive power; and
a fifth lens having a negative power,
wherein,
the first lens, the diaphragm, the second lens, the third lens, the fourth lens, and the fifth lens are arranged in that order from the object side to an image plane side,
(a) the first lens has a bending factor that satisfies the following conditional expression (1):

$$1 \leq qL1 \leq 100, \tag{1}$$

where qL1 represents the bending factor of the first lens and is expressed as follows:

$$qL1=(RL1S2+RL1S1)/(RL1S2-RL1S1),$$

where RL1S1 represents a curvature radius of a first surface of the first lens, and RL1S2 represents a curvature radius of a second surface of the first lens, (b) the second lens satisfies the following conditional expression (2);

$$0.3 \leq f2/f \leq 10, \tag{2}$$

where f represents a total focal length, and f2 represents a focal length of the second lens, (c) the third lens satisfies the following conditional expression (3):

$$-10 \leq f3/f \leq -0.4, \tag{3}$$

where f represents a total focal length, and f3 represents a focal length of the third lens, (d) the fourth lens has a second surface, a curvature radius of which satisfies the following conditional expression (4):

$$-3 \leq RL4S2/f \leq -0.08, \tag{4}$$

were f represents a total focal length, and RL4S2 represents the curvature radius of the second surface of the fourth lens, (e) the fifth lens has a first surface, a curvature radius of which satisfies the following conditional expression (5):

$$-3 \leq RL5S1/f \leq -0.05, \tag{5}$$

where f represents a total focal length, and RL5S1 represents the curvature radius of the first surface of the fifth lens, (f) the first lens, the second lens, and the third lens have Abbe numbers of vL1, vL2, and vL3, respectively, which satisfy the following conditional expressions (6), (7), and (8);

$$40 \leq vL1 \leq 70, \tag{6}$$

$$40 \leq vL2 \leq 70, \text{ and} \tag{7}$$

$$10 \leq vL3 \leq 40 \tag{8},$$

and (g) a total optical length satisfies the following conditional expression (9):

$$0.8 \leq TT/f \leq 5, \tag{9}$$

where f represents a total focal length, and TT represents the total optical length.

18. The optical unit according to claim 17, wherein a numerical aperture of the optical unit is 2.0.

19. The optical unit according to claim 17, wherein at least the first, second, third, and fifth lenses are formed of plastic.

20. The optical unit according to claim 19, wherein the fourth lens is formed of glass.

21. An image pickup apparatus, comprising:
an image pickup element; and
an optical unit form an image of a subject on the image pickup element, the optical unit including
(i) a first lens that is a positive meniscus lens which is convex toward an object side,
(ii) a diaphragm,
(ii) a second lens having a positive power,
(iii) a third lens having a negative power,
(iv) a fourth lens having a positive power, and
(v) a fifth lens having a negative power,
wherein,
the first lens, the diaphragm, the second lens, the third lens, the fourth lens, and the fifth lens are arranged in that order from the object side to an image plane side, (a) the first lens has a bending factor that satisfies the following conditional expression (1):

$$1 \leq qL1 \leq 100, \tag{1}$$

where qL1 represents the bending factor of the first lens and is expressed as follows:

$$qL1 = (RL1S2 + RL1S1)/(RL1S2 - RL1S1),$$

where RL1S1 represents a curvature radius of a first surface of the first lens, and RL1S2 represents a curvature radius of a second surface of the first lens, (b) the second lens satisfies the following conditional expression (2):

$$0.3 \leq f2/f \leq 10 \tag{2}$$

where f represents a total focal length, and f2 represents a focal length of the second lens, (c) the third lens satisfies the following conditional expression (3):

$$-10 \leq f3/f \leq -0.4, \tag{3}$$

where f represents a total focal length, and f3 represents a focal length of the third lens, (d) the fourth lens has a second surface, a curvature radius of which satisfies the following conditional expression (4):

$$-3 \leq RL4S2/f \leq -0.08, \tag{4}$$

were f represents a total focal length, and RL4S2 represents the curvature radius of the second surface of the fourth lens, (e) the fifth lens has a first surface, a curvature radius of which satisfies the following conditional expression (5):

$$-3 \leq RL5S1/f \leq -0.05, \tag{5}$$

where f represents a total focal length, and RL5S1 represents the curvature radius of the first surface of the fifth lens, (f) the first lens, the second lens, and the third lens have Abbe numbers of vL1, vL2, and vL3, respectively, which satisfy the following conditional expressions (6), (7), and (8):

$$40 \leq vL1 \leq 70, \tag{6}$$

$$40 \leq vL2 \leq 70, \text{ and} \tag{7}$$

$$10 \leq vL3 \leq 40 \tag{8},$$

and (g) a total optical length satisfies the following conditional expression (9):

$$0.8 \leq TT/f \leq 5, \tag{9}$$

where f represents a total focal length, and TT represents the total optical length.

* * * * *